United States Patent
Kubo

(10) Patent No.: US 8,676,137 B2
(45) Date of Patent: Mar. 18, 2014

(54) MOBILE WIRELESS TERMINAL, A METHOD OF MEASURING SIGNAL STRENGTH OF A RECEIVED SIGNAL, AND A METHOD OF SEARCHING FOR A BASE STATION

(75) Inventor: Yoshiyuki Kubo, Kawasaki (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 0 days.

(21) Appl. No.: 13/354,914

(22) Filed: Jan. 20, 2012

(65) Prior Publication Data
US 2012/0120999 A1 May 17, 2012

Related U.S. Application Data

(63) Continuation of application No. PCT/JP2010/054403, filed on Mar. 16, 2010.

(30) Foreign Application Priority Data

Nov. 27, 2009 (JP) ................................ 2009-270620

(51) Int. Cl.
*H04W 16/18* (2009.01)
(52) U.S. Cl.
USPC ........... 455/102; 375/224; 375/142; 455/135; 455/504; 455/506; 370/209; 370/210
(58) Field of Classification Search
USPC .................. 455/67.11, 216, 550.1, 249.1, 22, 455/277.2, 506, 450, 434, 509, 454; 375/142, 146, 150, 295, 309; 370/335, 370/342, 330, 209
See application file for complete search history.

(56) References Cited

U.S. PATENT DOCUMENTS 6,091,702 A * 7/2000 Saiki .............................. 370/203
7,133,434 B1 * 11/2006 Toskala et al. ................ 375/148
(Continued)

FOREIGN PATENT DOCUMENTS

JP 2008-010954 A 1/2008
JP 2008-270905 A 11/2008

OTHER PUBLICATIONS

International Search Report dated Jun. 15, 2010 as received in application No. PCT/JP2010/054403.
(Continued)

*Primary Examiner* — Mahendra Patel
(74) *Attorney, Agent, or Firm* — Maschoff Brennan

(57) ABSTRACT

A mobile wireless terminal includes a wireless receiving part configured to receive a wireless signal from a base station which belongs to a mobile communication system using a time-frequency conversion for baseband processing; a received signal processing part that includes a time-frequency converting circuit and is configured to process the wireless signal; a setting part configured to successively set central frequencies within regions, wherein a frequency band that the mobile communication system uses is divided into the regions having a predetermined bandwidth; and a received signal strength measuring part configured to measure signal strength of received signals over the regions of the frequency band that the mobile communication system uses based on time-frequency conversion results from the time-frequency converting circuit, the time-frequency conversion results being obtained for the respective regions using the respective central frequencies set by the setting part.

12 Claims, 5 Drawing Sheets

(56) References Cited

U.S. PATENT DOCUMENTS

| | | | |
|---|---|---|---|
| 7,663,502 B2* | 2/2010 | Breed | 340/12.25 |
| 8,155,649 B2* | 4/2012 | Mchenry et al. | 455/434 |
| 2005/0152460 A1* | 7/2005 | Yoshimi et al. | 375/257 |
| 2005/0170839 A1* | 8/2005 | Rinne et al. | 455/446 |
| 2005/0233752 A1* | 10/2005 | Laroia et al. | 455/450 |
| 2011/0274083 A1* | 11/2011 | Bazzo et al. | 370/331 |

OTHER PUBLICATIONS

Japanese Office Action dated Aug. 20, 2013 in patent Application 2011-543121 Full Translation of the Office Action.
NTT Docomo, "Initial Access Procedure for Asymmetric Wider Bandwidth in LTE-Advanced", 3GPP TSG RAN WG1 Meeting #57 San Francisco, USA, May 4-8, 2009(Original R1-083680) R1-092099.

* cited by examiner

MOBILE WIRELESS TERMINAL, A METHOD OF MEASURING SIGNAL STRENGTH OF A RECEIVED SIGNAL, AND A METHOD OF SEARCHING FOR A BASE STATION

CROSS-REFERENCE TO RELATED APPLICATIONS

This is a U.S. continuation application filed under 35 USC 111 (a) claiming benefit under 35 USC 120 and 365 (c) based on International Application No. PCT/JP2010/054403, filed on Mar. 16, 2010, the entire contents of which are hereby incorporated by reference.

FIELD

The disclosures herein generally relate to a mobile wireless terminal, a method of measuring signal strength of a received signal, and a method of searching for a base station.

BACKGROUND

Recently, mobile communication systems, such as WiMAX (World Interoperability for Microwave Access), LTE (Long Term Evolution), etc., which adopt OFDM (Orthogonal Frequency Division Multiplexing) modem scheme using a time-frequency conversion for baseband processing are known. Further, in the mobile communication systems which adopt the OFDM modem scheme using the time-frequency conversion for the baseband processing, a communication apparatus and a communication method are proposed to perform communication processing, such as a handover, at high speed and with high quality (see Patent Document 1: Japanese Laid-open Patent Publication No. 2008-270905, for example). Specifically, in the mobile wireless terminal disclosed in Patent Document 1, if it is determined in a power measuring part that a reception signal received by a communication part is smaller than or equal to a predetermined value, a frequency converting part performs calculations by enlarging a time-frequency conversion range for the received signal. The frequency converting part measures signal strength within the enlarged frequency range to detect a frequency in which the received signal has the signal strength greater than predetermined signal strength. The communication part performs a connection process using the signal of the detected frequency.

For example, in the case of the mobile communication system of LTE, a specification defines a maximum frequency bandwidth as 20 MHz, which is available for communications between mobile wireless terminals and base stations. If the mobile wireless terminal communicates with the base station using the maximum frequency bandwidth of 20 MHz, when the reception signal received by the communication part is smaller than or equal to the predetermined value, even the technique disclosed in Patent Document 1 cannot enlarge the time-frequency conversion range and thus cannot measure the reception signal strength in a band other than the band used for the communication.

Further, Patent Document 1 basically assumes a case where the mobile wireless terminal performs the handover during the communication, and thus does not specifically disclose how to search for the base station if the mobile wireless terminal is in a standby status or moved to dead space. Furthermore, in the case of the mobile wireless terminal which is applicable not only for the mobile communication systems adopting the OFDM modem scheme using the time-frequency conversion for the baseband processing but also for mobile communication systems (for example, WCDMA, CDMA 2000, GSM, etc.) adopting a modem scheme not using the time-frequency conversion for the baseband processing, Patent Document 1 fails to disclose how to search for the base station in the mobile communication systems which adopt a wireless accessing scheme which does not use the time-frequency conversion for the baseband processing.

The present invention was made in consideration of the matter described above, and it is an object of the present invention to provide a mobile wireless terminal, a method of measuring signal strength of a received signal, and a method of searching for a base station with which a time required to measure signal strength in a frequency band used may be shortened and power consumption involved in measuring the signal strength may be reduced.

SUMMARY

According to an aspect of the embodiment, a mobile wireless terminal includes a wireless receiving part configured to receive a wireless signal from a base station which belongs to a mobile communication system using a time-frequency conversion for baseband processing; a received signal processing part that includes a time-frequency converting circuit and is configured to process the wireless signal from the base station which belongs to the mobile communication system; a setting part configured to successively set, in the wireless receiving part, central frequencies within regions, wherein a frequency band that the mobile communication system uses is divided into the regions having a predetermined bandwidth; and a received signal strength measuring part configured to measure signal strength of a received signal in the received signal processing part over the regions of the frequency band that the mobile communication system uses based on time-frequency conversion results from the time-frequency converting circuit, the time-frequency conversion results being obtained for the respective regions using the respective central frequencies set by the setting part.

According to another aspect of the embodiment, a mobile wireless terminal includes a wireless receiving part configured to receive a wireless signal from a base station which belongs to a first mobile communication system using a time-frequency conversion for baseband processing, or from a base station which belongs to a second mobile communication system not using the time-frequency conversion for the baseband processing; a first received signal processing part that includes a time-frequency converting circuit and is configured to process the wireless signal from the base station which belongs to the first mobile communication system; a second received signal processing part configured to process the wireless signal from the base station which belongs to the second mobile communication system; a setting part configured to successively set, in the wireless receiving part, central frequencies within regions, wherein a frequency band that the second mobile communication system uses is divided into the regions having a predetermined bandwidth; and a received signal strength measuring part configured to measure signal strength of a received signal in the first received signal processing part over the regions of the frequency band that the second mobile communication system uses based on time-frequency conversion results from the time-frequency converting circuit, the time-frequency conversion results being obtained for the respective regions using the respective central frequencies set by the setting part.

According to yet another aspect of the embodiment, a mobile wireless terminal includes a wireless receiving part configured to receive a wireless signal from a base station which belongs to a mobile communication system using a time-frequency conversion for baseband processing; a received signal processing part that includes a time-frequency converting circuit and is configured to process the wireless signal from the base station which belongs to the mobile communication system; a first setting part configured to successively set, in the wireless receiving part, central frequencies within regions, wherein a frequency band that the mobile communication system uses is divided into the regions having a predetermined bandwidth; and a detecting part configured to detect one or more null frequencies over the regions of the frequency band that the mobile communication system uses based on time-frequency conversion results from the time-frequency converting circuit, the time-frequency conversion results being obtained for the respective regions using the respective central frequencies set by the first setting part; a second setting part configured to set, in the wireless receiving part, the null frequency detected by the detecting part as the central frequency; and a received signal strength measuring part configured to detect a symbol including a sync signal appearing at a predetermined cycle in the wireless signal transmitted from the base station which belongs to the mobile communication system, and measure signal strength of a received signal in the received signal processing part based on a time-frequency conversion result from the time-frequency converting circuit, the time-frequency conversion result being obtained for the symbol including the sync signal using the null frequency set as the central frequency by the setting part.

According to yet another aspect of the embodiment, a method of measuring reception signal strength includes receiving a wireless signal from a base station which belongs to a mobile communication system using a time-frequency conversion for baseband processing; performing a time-frequency conversion to process the wireless signal from the base station which belongs to the mobile communication system; successively setting central frequencies within regions, wherein a frequency band that the mobile communication system uses is divided into the regions having a predetermined band width; and measuring signal strength of a received signal in the process of performing the time-frequency conversion over the regions of the frequency band that the mobile communication system uses based on time-frequency conversion results, the time-frequency conversion results being obtained for the respective regions using the respective set central frequencies.

According to another aspect of the embodiment, a method of measuring reception signal strength includes receiving a wireless signal from a base station which belongs to a first mobile communication system using a time-frequency conversion for baseband processing, or from a base station which belongs to a second mobile communication system not using the time-frequency conversion for the baseband processing; performing a time-frequency conversion to process the wireless signal from the base station which belongs to the first mobile communication system; processing the wireless signal from the base station which belongs to the second mobile communication system; successively setting central frequencies within regions, wherein a frequency band that the second mobile communication system uses is divided into the regions having a predetermined bandwidth; and measuring signal strength of a received signal in the process of performing the time-frequency conversion over the regions of the frequency band that the second mobile communication system uses based on time-frequency conversion results, the time-frequency conversion results being obtained for the respective regions using the respective set central frequencies.

According to yet another aspect of the embodiment, a method of measuring reception signal strength includes receiving a wireless signal from a base station which belongs to a mobile communication system using a time-frequency conversion for baseband processing; performing a time-frequency converting process to process the wireless signal from the base station which belongs to the mobile communication system; successively setting central frequencies within regions, wherein a frequency band that the mobile communication system uses is divided into the regions having a predetermined band width; detecting one or more null frequencies over the regions of the frequency band that the mobile communication system uses based on time-frequency conversion results, the time-frequency conversion results being obtained for the respective regions using the respective set central frequencies; setting the detected null frequency as the central frequency; and detecting a symbol of a sync signal appearing at a predetermined cycle in the wireless signal transmitted from the base station which belongs to the mobile communication system, and measuring a signal strength of a received signal in the process of performing the time-frequency converting process based on a time-frequency conversion result, the time-frequency conversion result being obtained for the symbol including the sync signal using the null frequency set as the central frequency.

According to yet another aspect of the embodiment, a method of searching for a base station includes receiving a wireless signal from a base station which belongs to a mobile communication system using a time-frequency conversion for baseband processing; performing a time-frequency conversion to process the wireless signal from the base station which belongs to the mobile communication system; successively setting central frequencies within regions, wherein a frequency band that the mobile communication system uses is divided into the regions having a predetermined band width; measuring signal strength of a received signal in the process of performing the time-frequency conversion over the regions of the frequency band that the mobile communication system uses based on time-frequency conversion results, the time-frequency conversion results being obtained for the respective regions using the respective set central frequencies; and searching for the base station which belongs to the mobile communication system, using the central frequency in which the received signal has the signal strength greater than a predetermined reference value.

According to yet another aspect of the embodiment, a method of searching for a base station includes receiving a wireless signal from a base station which belongs to a first mobile communication system using a time-frequency conversion for baseband processing, or from a base station which belongs to a second mobile communication system not using the time-frequency conversion for the baseband processing; performing a time-frequency conversion to process the wireless signal from the base station which belongs to the first mobile communication system; processing the wireless signal from the base station which belongs to the second mobile communication system; successively setting central frequencies within regions, wherein a frequency band that the second mobile communication system uses is divided into the regions having a predetermined bandwidth; measuring signal strength of a received signal in the process of performing the time-frequency conversion over the regions of the frequency band that the second mobile communication system uses based on time-frequency conversion results, the time-frequency conversion results being obtained for the respective regions using the respective set central frequencies; and searching for the base station which belongs to the second mobile communication system, using the central frequency in which the received signal has the signal strength greater than a predetermined reference value.

According to yet another aspect of the embodiment, a method of searching for a base station includes receiving a wireless signal from a base station which belongs to a mobile communication system using a time-frequency conversion for baseband processing; performing a time-frequency converting process to process the wireless signal from the base station which belongs to the mobile communication system; successively setting central frequencies within regions, wherein a frequency band that the mobile communication system uses is divided into the regions having a predetermined band width; detecting one or more null frequencies over the regions of the frequency band that the mobile communication system uses based on time-frequency conversion results, the time-frequency conversion results being obtained for the respective regions using the respective set central frequencies; setting the detected null frequency as the central frequency; detecting a symbol of a sync signal appearing at a predetermined cycle in the wireless signal transmitted from the base station which belongs to the mobile communication system, and measuring a signal strength of a received signal in the process of performing the time-frequency converting process based on a time-frequency conversion result, the time-frequency conversion result being obtained for the symbol including the sync signal using the null frequency set as the central frequency; and searching for the base station which belongs to the mobile communication system, using the central frequency in which the received signal has the signal strength greater than a predetermined reference value.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

In the following, embodiments will be described with reference to the accompanying drawings.

[First Embodiment]

A mobile wireless terminal 1 according to the first embodiment is configured to be applicable not only for the mobile communication systems (WiMAX (World Interoperability for Microwave Access), LTE (Long Term Evolution), etc.) adopting an OFDM modem scheme using the time-frequency conversion for the baseband processing but also for mobile communication systems (for example, WCDMA, CDMA 2000, GSM, etc.) adopting a modem scheme not using the time-frequency conversion for the baseband processing. It is noted that hereinafter the mobile communication system which adopts OFDM modem scheme using the time-frequency conversion for the baseband processing is referred to as "a mobile communication system A", and the mobile communication system (time-frequency conversion non-using system) which adopts a modem scheme not using the time-frequency conversion for the baseband processing is referred to as "a mobile communication system B".

Figure 1:
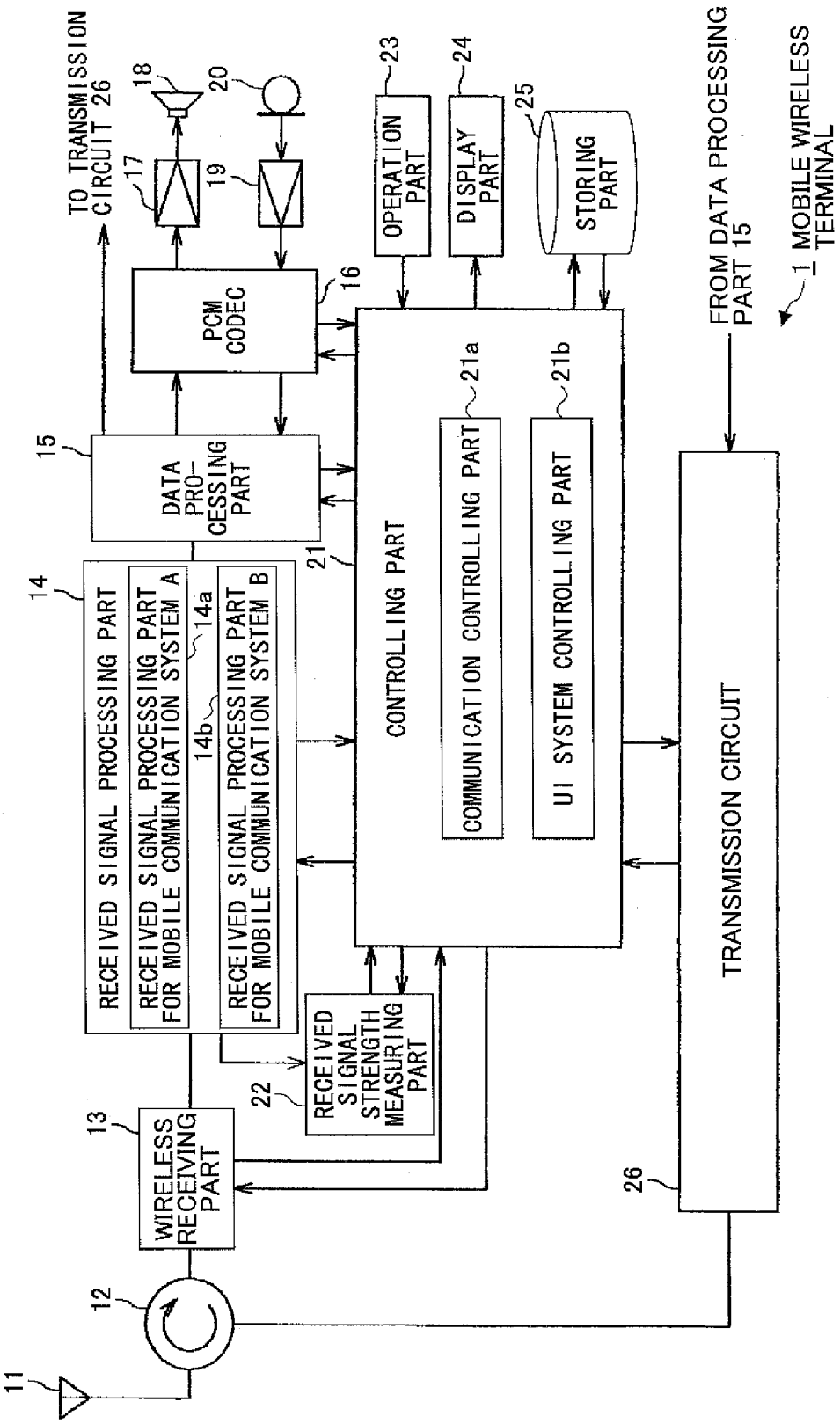
FIG. 1 is a block diagram for illustrating a configuration inside a mobile wireless terminal according to a first embodiment.

FIG. 1 illustrates a configuration inside a mobile wireless terminal 1 according to a first embodiment. The mobile wireless terminal 1 includes a transmission and reception antenna 11, a transmission and reception shared device 12, a wireless receiving part 13, a received signal processing part 14, a data processing part 15, a PCM codec 16, a telephone receiver amplifier 17, a receiver 18, a telephone transmitter amplifier 19, a microphone 20, a controlling part 21, a received signal strength measuring part 22, a operation part 23, a display part 24, a storing part 25 and a transmission circuit 26. The received signal processing part 14 includes a received signal processing part 14a for the mobile communication system A and a received signal processing part 14b for the mobile communication system B. Next, the respective components of the mobile wireless terminal 1 are described.

The transmission and reception antenna 11 transmits radio waves of the mobile communication system A or the mobile communication system B to which the mobile wireless terminal 1 is adapted, or receives radio waves of the mobile communication system A or the mobile communication system B to which the mobile wireless terminal 1 is adapted. The transmission and reception shared device 12 includes a circulator, a duplexer, etc., and transmits the radio waves received by the transmission and reception antenna 11 to the wireless receiving part 13. Further, the transmission and reception shared device 12 transmits a signal input from the transmission circuit 26 to the transmission and reception antenna 11. The wireless receiving part 13 includes a bandpass filter, a gain adjusting circuit, an A/D converter, etc., receives the wireless signal of a carrier frequency instructed by the controlling part 21, performs a frequency conversion (i.e., down-convert) to an intermediate frequency signal by mixing with a local oscillation signal output from a frequency synthesizer, and performs orthogonal demodulation of the down-converted intermediate frequency signal to generate a reception base band signal. The band-pass filter of the wireless receiving part 13 receives the wireless signals transmitted from the base station which belongs to the mobile communication system A or the mobile communication system B, and removes noise outside of a desired band from the received signal. Further, the gain adjusting circuit of the wireless receiving part 13 adjusts a signal amplitude such that it can be processed by the A/D converter located downstream of the gain adjusting circuit. The A/D converter of the wireless receiving part 13 converts the signal which has passed the band-pass filter into a digital signal of a baseband.

The received signal processing part 14 performs the baseband processing of the received base band signal (received base band digital signal) according to the communicating system (the mobile communication system A or the mobile communication system B). The received signal processing part 14 includes the received signal processing part 14a for the mobile communication system A as a baseband processing part according to the mobile communication system A, and the received signal processing part 14b for the mobile communication system B as a baseband processing part according to the mobile communication system B. The received signal processing part 14a for the mobile communication system A performs the baseband processing adapted to the mobile communication system (for example, LTE, etc.) which utilizes the time-frequency conversion for the baseband processing. Specifically, the received signal processing part 14a for the mobile communication system A includes, at least, a DFT part (time-frequency converting circuit), a frequency channel separating part, a descrambling part, a channel estimating part, a channel equalizing part, a data channel signal decoding part and a data signal decoding part.

The baseband digital signal is converted from a signal in a time domain into a signal in a frequency domain, that is to say, signals of respective sub-carriers by the DFT part (the discrete Fourier transform part, that is to say, a time-frequency converting circuit) after a guard interval is removed by the GI removing part (not shown). The DFT part outputs the output signal which is divided on a sub-carrier basis to the frequency channel separating part. The frequency channel separating part separates pilot channel signals, which are allocated to the corresponding sub-carriers, from data channel signals. The frequency channel separating part outputs the separated signals (the pilot channel signals and the data channel signals) to the descrambling part. The descrambling part descrambles the respective signals using corresponding scrambling code sequences applied in an OFDM transmitter (i.e., the base station) and output the descrambled signals to the channel equalizing part. It is noted that the scrambling code sequence applied in the OFDM transmitter (i.e., the base station) is known on the side of the mobile wireless terminal 1 as an OFDM receiver. The frequency channel separating part outputs the separated pilot channel signals to the channel estimating part. The channel estimating part estimates a channel by performing an averaging process, an interpolation process, etc., of the pilot channel signals. The channel estimating part outputs channel estimation values, which represent the channel response, to the channel equalizing part. The channel equalizing part performs channel equalization for the respective data channel signals using the channel estimation values. The data channel signals after the channel equalization are decoded by the data channel signal decoding part, and a data bit sequence to be an original data signal is reproduced by the data signal decoding part. It is noted that the time-frequency converting circuit may be implemented by using FFT (fast Fourier transformation).

The received signal processing part 14b for the mobile communication system B performs the baseband processing adapted to the mobile communication system (for example, WCDMA, etc.) which does not utilize the time-frequency conversion for the baseband processing. The data processing part 15 converts the baseband signal, which is processed by the received signal processing part 14, into data and voice. The controlling part 21 includes a CPU (Central Processing Unit), a ROM (Read Only Memory), a RAM (Random Access Memory), etc. The CPU of the controlling part 21 performs various processes according to programs stored in the ROM or various application programs including an operating system (OS) and control programs loaded in the RAM from the storing part 25, generates various controls signals, and supplies them to the respective part to centrally control the mobile wireless terminal 1. The RAM stores, as necessary, the data which is necessary for the CPU to execute the various processes. Specifically, the controlling part 21 includes a control function to implement voice communications and data communications according to the mobile communication system A or the mobile communication system B. The controlling part 21 controls the carrier frequencies which the wireless receiving part 13 and the transmission circuit 26 use and searches for the pilot signals based on the reception result in the wireless receiving part 13. Further, the controlling part 21 includes a control function to switch a wireless communication scheme set in the received signal processing part 14 at a predetermined timing.

The controlling part 21 includes one or more CPUs, as necessary. It is noted that in the embodiment there are two CPUs; however, a CPU may be used or more than three CPUs may be used. A communication controlling part 21a includes a CPU for communication control (not shown) and performs control for communication processes. The communication controlling part 21a controls the communication processes using the transmission and reception antenna 11, the wireless receiving part 13, the transmission circuit 26, the received signal processing part 14, the data processing part 15, the PCM codec 16, the telephone receiver amplifier 17, the receiver 18, the telephone transmitter amplifier 19, the microphone 20, etc. On the other hand, a UI system controlling part 21b includes a CPU for UI processing (not shown) and performs control of the UI processes using the storing part 25, the operation part 23, the display part 24, a clock circuit (not shown), etc.

The storing part 25 is a flash memory element, which is an electrically rewritable nonvolatile memory or a HDD (Hard Disk Drive), for example. The storing part 25 stores various application programs executed by the CPU of the controlling part 21 and various items of data, control programs and control data of the mobile wireless terminal 1, and identification information uniquely allocated to the mobile wireless terminal 1 and a user. Further, the storing part 25 stores telephone directory data in which names are associated with telephone numbers, data obtained via the data communications and downloaded data, as necessary. Further, the mobile wireless terminal 1 includes a power supply circuit for generating a predetermined operation power supply voltage Vcc based on an output of a battery to supply it to the respective circuit parts, and a clock circuit (timer) for measuring the current time.

It is noted that the mobile wireless terminal 1 includes the telephone receiver amplifier 17, the receiver 18 for amplifying and outputting a telephone reception voice signal, the telephone transmitter amplifier 19, the microphone 20 to which a telephone transmitter voice signal is input, the operation part 23 for accepting demands from the user, and the display part 24 for displaying images based on the received data.

The received signal strength measuring part 22 measures reception signal strength in the received signal processing part 14 and outputs the measured result to the controlling part 21. The transmission circuit 26 performs a series of processes including a transmission baseband process for transmitting communication data to the base station belonging to the mobile communication system A or the mobile communication system B which the mobile wireless terminal 1 can utilize, a wireless process, etc.

The mobile wireless terminal 1 according to the first embodiment is applicable not only for the mobile communication system A which adopts a wireless accessing scheme based on OFDM, OFDMA, or the like which uses the time-frequency conversion for the baseband processing but also for mobile communication system B which adopts a wireless accessing scheme which does not use the time-frequency conversion for the baseband processing. Thus, when the mobile wireless terminal 1 according to the first embodiment searches for the base station of the mobile communication system B, the mobile wireless terminal 1 uses the time-frequency converting function of the received signal processing part 14a for the mobile communication system A to measure the signal strength of the received signal from the base station of the mobile communication system B and searches for the base station of the mobile communication system B based on the measurement results. Next, the base station searching process for the mobile communication system B using this method is described.

Figure 2:
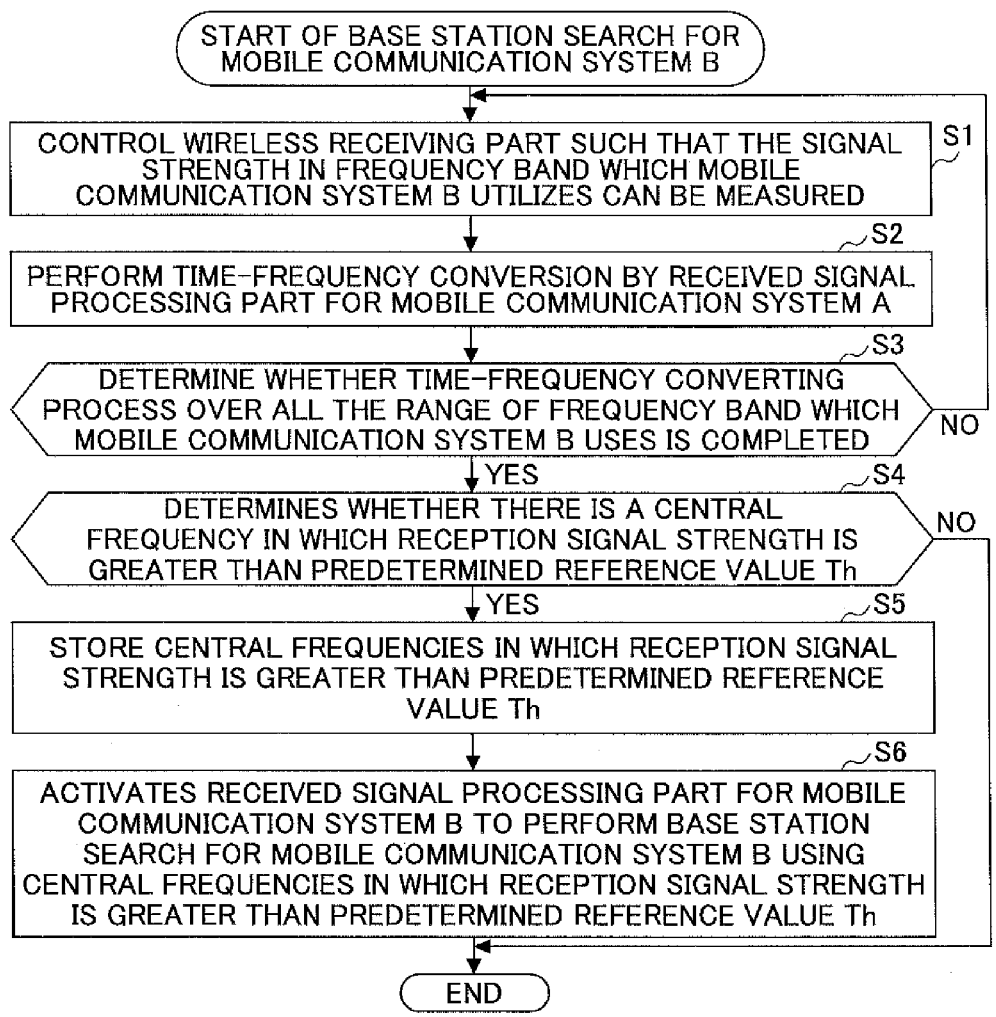
FIG. 2 is a flowchart for explaining a base station searching process of a mobile communication system B in the mobile wireless terminal illustrated in FIG. 1.

The base station searching process for the mobile communication system B in the mobile wireless terminal 1 illustrated in FIG. 1 is described with reference to a flowchart illustrated in FIG. 2. It is noted that in the case of the base station searching process illustrated in FIG. 2, it is basically assumed that the mobile wireless terminal 1 is in a standby status at the base station belonging to the mobile communication system A; however, the status of the mobile wireless terminal 1 is not limited to this status. For example, the mobile wireless terminal 1 may be in a status other than the standby status at the base station belonging to the mobile communication system A, or may be on line (i.e., in a status where communications are in progress).

Further, in the case of the embodiment, the "base station search" is so-called cell search and indicates a process for detecting a frequency, reception timing and a cell number (ID) of the cell to which the mobile wireless terminal 1 is to be connected with a minimum transmission loss.

In step S1, if the mobile wireless terminal 1 is in a standby status at the base station belonging to the mobile communication system A, when the communication controlling part 21a of the controlling part 21 determines to start the base station search for the mobile communication system B, the communication controlling part 21a controls the wireless receiving part 13 to set a central frequency such that the signal strength in the frequency band which the mobile communication system B utilizes can be measured. In other words, the communication controlling part 21a sets a local oscillator frequency for a down-conversion to the central frequency and selects the band-pass filter. In step S2, the communication controlling part 21a controls the received signal processing part 14a for the mobile communication system A to perform the time-frequency conversion by the received signal processing part 14a for the mobile communication system A using the set central frequency. At that time, the received signal processing part 14a for the mobile communication system A activates only the time-frequency converting circuit (for example, the DFT part, the FFT part, etc.) among the process circuits in the received signal processing part 14a for the mobile communication system A according to the control of the communication controlling part 21a to perform the time-frequency converting process (i.e., dividing the signal in the time domain into the signals in the frequency domain), and outputs this result to the received signal strength measuring part 22. The received signal strength measuring part 22 measures the signal strength of the received signal in the received signal processing part 14a for the mobile communication system A and outputs the measured result to the controlling part 21. In step S3, the communication controlling part 21a determines whether the time-frequency converting process over all the range of the frequency band which the mobile communication system B uses is completed. In step S3, if the communication controlling part 21a determines time-frequency converting process over all the range of the frequency band which the mobile communication system B uses is not completed (i.e., there remains a frequency band for which the time-frequency converting process has not been performed yet), the process routine goes to step S1. With this arrangement, the mobile wireless terminal 1 can control the wireless receiving part 13 again such that the signal strength for the frequency band for which the time-frequency converting process has not been performed yet can be measured.

On the other hand, in step S3, if the communication controlling part 21a determines time-frequency converting process over all the range of the frequency band which the mobile communication system B uses is completed, the process routine goes to step S4. In step S4, the communication controlling part 21a determines whether there is a frequency (central frequency), within the frequency band which the mobile communication system B uses, in which the reception signal strength is greater than a predetermined reference value (Th) related to the signal strength. In step S4, if the communication controlling part 21a determines that there is at least one frequency, within the frequency band which the mobile communication system B uses, in which the reception signal strength is greater than the predetermined reference value (Th) related to the signal strength, the process routine goes to step S5. On the other hand, in step S4, if the communication controlling part 21a determines that there is at least one frequency, within the frequency band which the mobile communication system B uses, in which the reception signal strength is greater than the predetermined reference value (Th) related to the signal strength, the base station searching process ends. In step S5, the communication controlling part 21a stores, in the storing part 25, all the frequencies (central frequencies) in which the reception signal strength is greater than the predetermined reference value (Th) found in step S4. In step S6, the communication controlling part 21a activates the received signal processing part 14b for the mobile communication system B to perform the base station search for the mobile communication system B using the frequency which is stored in the storing part 25 and has reception signal strength greater than the predetermined reference value (Th). At that time, if the storing part 25 stores plural frequencies which have reception signal strength greater than the predetermined reference value (Th), the communication controlling part 21a performs the base station search for the mobile communication system B using the respective frequencies stored in the storing part 25.

As described above, the mobile wireless terminal 1 according to the first embodiment uses the time-frequency converting circuit of the received signal processing part 14a for the mobile communication system A to measure the reception signal strength in the frequency band which the mobile communication system B uses, when it performs the base station search for the mobile communication system B which does not use the time-frequency conversion if the mobile wireless terminal 1 is in a standby status at the base station belonging to the mobile communication system A or in another status. With this arrangement, it is possible to shorten a time required to measure the signal strength in the frequency band which the mobile communication system B utilizes. Next, effects of the mobile wireless terminal 1 according to the first embodiment are described with reference to FIG. 3 and FIG. 4.

Figure 3:
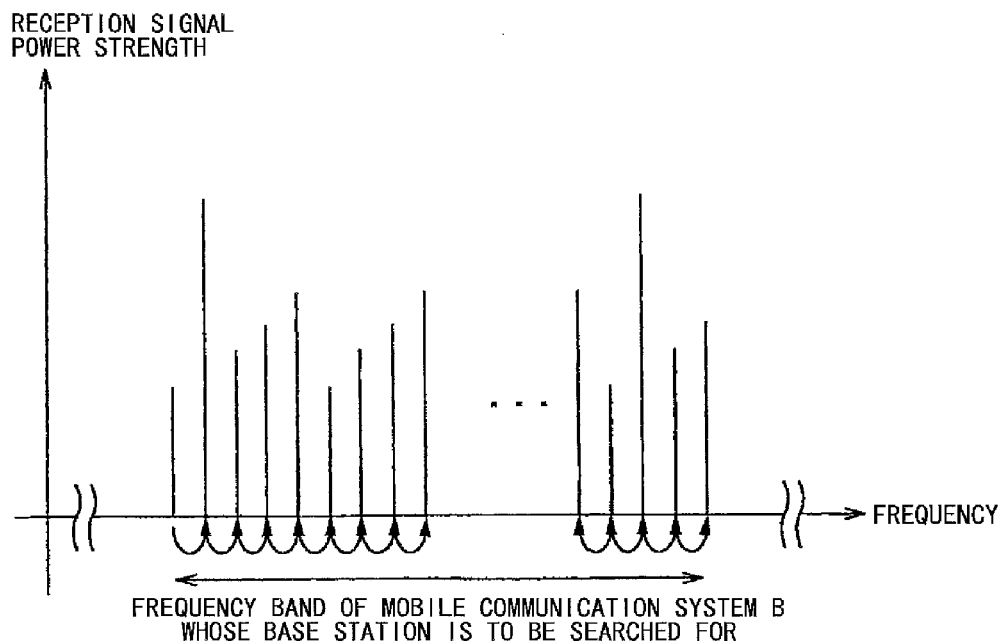
FIG. 3 is a diagram for illustrating a way of measuring reception signal strength when a mobile wireless terminal according to a related art performs base station search for the mobile communication system B which does not use a time-frequency conversion.

FIG. 3 illustrates a way of measuring reception signal strength when a mobile wireless terminal according to a related art performs base station search for the mobile communication system B which does not use a time-frequency conversion. As illustrated in FIG. 3, in the case of the measurement of the signal strength at the time of the base station search for the mobile communication system B, the mobile wireless terminal according to the related art has to perform the measurement for all the central frequency candidates which the mobile communication system B, which does not use the time-frequency conversion, utilizes, by adjusting the central frequencies one by one for all the available central frequency candidates to perform the measurement of the signal strength based on the adjustment values of the gain adjusting circuit in the wireless receiving part (corresponding to wireless receiving part 13 illustrated in FIG. 1). The central frequency candidates are spaced apart with an interval defined by the specification. For example, in the case of WCDMA which is the third generation mobile communication system, the central frequency candidates are spaced apart with an interval of 200 kHZ. In this case, it takes a long time to complete the measurement of the signal strength for all the central frequency candidates. For example, if the mobile wireless terminal according to the related art measures the signal strength for the IMT-2000 frequency band (60 MHz) allocated in the third generation mobile communication system, it is necessary to perform the measurement of the reception signal strength 300 times (=60[MHz]÷200[kHz]). If it is assumed that 5 ms is taken for the measurement of the signal strength for a central frequency candidate, a total processing time becomes 1.5 s(=5[ms]×300).

Figure 4:
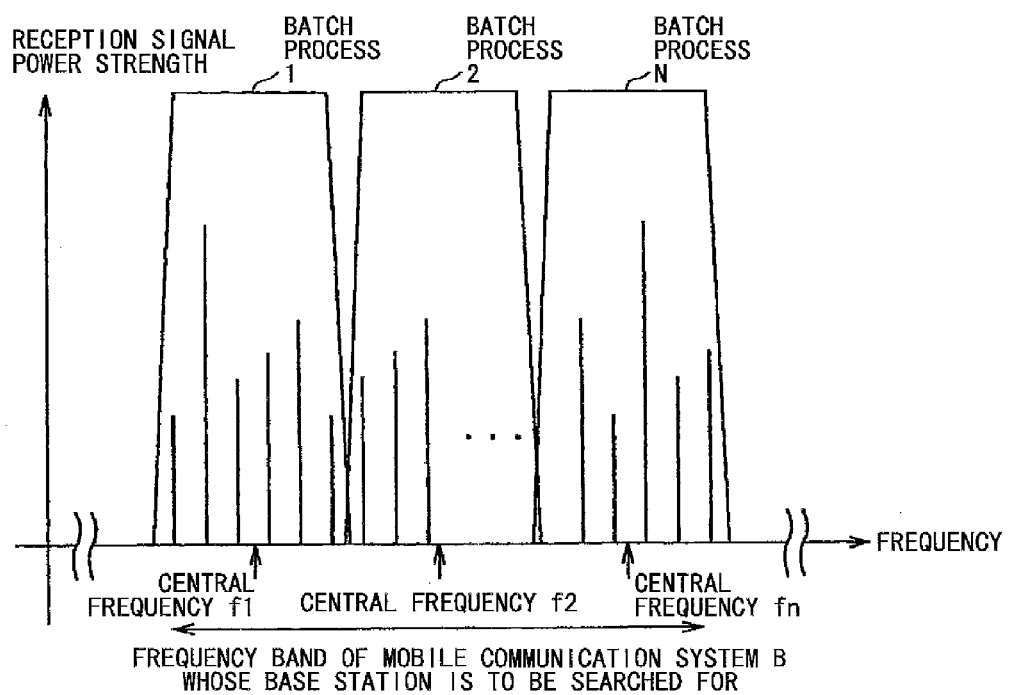
FIG. 4 is a diagram for illustrating a way of measuring reception signal strength when a mobile wireless terminal according to the first embodiment performs base station search for the mobile communication system B which does not use a time-frequency conversion.

To the contrary, the mobile wireless terminal 1 according to the first embodiment can perform the measurement of the reception signal strength at the time of the base station search for the mobile communication system B as a single unit on a constant bandwidth basis by using the time-frequency converting circuit of the received signal processing part 14a for the mobile communication system A. The constant bandwidth may be a maximum frequency bandwidth defined by the specification available at time of the communication with the base station, etc. Needless to say, the constant bandwidth may be smaller than the maximum frequency band. FIG. 4 illustrates a way of measuring reception signal strength when a mobile wireless terminal 1 according to the first embodiment performs base station search for the mobile communication system B which does not use a time-frequency conversion. Specifically, as illustrated in FIG. 4, the mobile wireless terminal 1 can set the central frequencies f1 through fn by the processes of S1 through S3 in FIG. 2 and uses the time-frequency converting circuit of the received signal processing part 14a for the mobile communication system A to perform the measurement as a single unit on a constant bandwidth basis (i.e., perform the batch processes 1 through N). For this reason, as illustrated in FIG. 4, the number of times for setting the central frequency is reduced in comparison with the related art (illustrated in FIG. 3), and thus the time required to measure the signal strength in searching for the base station of the mobile communication system B which does not use the time-frequency conversion is reduced significantly. For example, it is assumed that the mobile communication system A is the LTE system and the mobile wireless terminal 1 can execute the time-frequency converting process every frequency bandwidth of 20 MHz. In this case, in order to measure the signal strength for the IMT-2000 frequency band (60 MHz) allocated in the third generation mobile communication system, the measurement of the signal strength may be performed only 3 times (=60[MHz]÷20[MHz]) for the IMT-2000 frequency band in the third generation mobile communication system described above. The time-frequency converting process in the LTE system should be performed for every wireless symbol (about 70 µs) according to the LTE specification, and thus the process time of the time-frequency converting process can be estimated less than 70 µs. In this case, the total process time which the mobile wireless terminal 1 according to the first embodiment requires to perform the measurement of the signal strength of the received signal for the mobile communication system B is about 210 µs ≈70[µs]×3). Therefore, according to the mobile wireless terminal 1 of the first embodiment, it is possible to reduce the process time required to perform the measurement of the signal strength of the received signal for the mobile communication system B and reduce the power consumption involved in measuring the signal strength.

It is noted that in the case of FIG. 4, for the sake of the simplification of the explanation, the frequency bandwidths with which the mobile wireless terminal 1 of the first embodiment performs the time-frequency converting process using the time-frequency converting circuit of the received signal processing part 14a for the mobile communication system A are uniform with reference to the central frequencies set in the frequency bandwidths; however, this configuration is not indispensable, and the whole frequency bandwidth for which the time-frequency converting process is performed may be divided into plural sections (regions) in any manner. For example, the frequency bandwidth used for the division may differ on a region basis, or two frequency bandwidths may be used for every set of the two regions.

Further, in the case of the mobile wireless terminal 1 according to the first embodiment, the following additional effects can be obtained in comparison with the mobile wireless terminal according to the related art. In order to search for the base station of the mobile communication system B which does not use the time-frequency conversion when the mobile wireless terminal 1 according to the first embodiment is in a standby status at the base station belonging to the mobile communication system A or is on line, etc., the mobile wireless terminal 1 according to the first embodiment can measure the reception signal strength using the time-frequency converting circuit of the received signal processing part 14a for the mobile communication system A, as illustrated in FIG. 2 and FIG. 4. Thus, the received signal processing part 14b for the mobile communication system B may be activated only if the signal strength is higher than a certain threshold (i.e., the predetermined reference value Th). Thus, the mobile wireless terminal 1 according to the first embodiment can prevent unnecessary activation of the circuits which would occur when the signal strength measuring process for the base station search is started from the beginning, and thus eliminate the processing time and the power consumption for such an unnecessary activation of the circuits.

It is noted that the mobile wireless terminal 1 according to the first embodiment is configured to be applicable not only for the mobile communication systems which adopt the OFDM modem scheme using the time-frequency conversion for the baseband processing but also for the mobile communication systems which adopt the modem scheme not using the time-frequency conversion for the baseband processing, and it is assumed that the search for the base station of the mobile communication system B which does not use the time-frequency conversion is desired to be performed when the mobile wireless terminal 1 is in a standby status at the base station belonging to the mobile communication system A or is on line, etc. However, the embodiment is not limited to such a case. For example, if the mobile wireless terminal 1, which is applicable at least for the mobile communication systems which adopt the OFDM modem scheme using the time-frequency conversion for the baseband processing, performs an intermittent receiving operation at a predetermined intermittent receiving cycle, during a time other than the time of an intermittent reception using PICH (Paging Indicator Channel), the mobile wireless terminal 1 may perform the time-frequency converting processes plural times within the maximum frequency bandwidth of 20 MHz defined according to the specification to perform the time-frequency converting processes over all the frequency band which the mobile communication system A uses, and use the central frequency, which is obtained as a result of the time-frequency converting processes and has the reception signal strength higher than the predetermined reference value Th, to search for the base station of the mobile communication system A. Here, the mobile wireless terminal 1 performs the intermittent receiving operation at the predetermined intermittent receiving cycle (for example, 5 s). Specifically, the "intermittent receiving operation" indicates an operation for activating the communication controlling part 21a to activate the wireless receiving part 13, the received signal processing part 14, etc., so as to perform a predetermined process (a network synchronization process), only when the signal transmitted from the base station is necessary under a situation where there is no user operation, in order to reduce the power requirements. The intermittent receiving operation involves a status (a CPU active status) in which the CPU of the communication controlling part 21a is active to perform the network synchronization process, etc., and a status (a sleep status) in which the CPU of the communication controlling part 21a is not active. Thus, in the case described above, the mobile wireless terminal 1 performs the time-frequency converting processes plural times within the maximum frequency bandwidth of 20 MHz defined according to the specification to perform the time-frequency converting processes over all the frequency band which the mobile communication system A uses, if the mobile wireless terminal 1 performs the intermittent receiving operation at the predetermined intermittent receiving cycle and is in its original sleep status other than the time of the intermittent reception using PICH (Paging Indicator Channel).

In this way, by performing the time-frequency converting processes plural times within the maximum frequency bandwidth of 20 MHz defined according to the specification, it becomes possible to substantially enlarge the time-frequency converting range beyond the limit of the maximum frequency bandwidth of 20 MHz defined according to the specification and thus measure the reception signal strength over all the range of the frequency band which the mobile communication system A uses while communications are not in progress.

[Second Embodiment]

It is noted that the mobile wireless terminal 1 according to the first embodiment is configured to be applicable not only for the mobile communication systems which adopt the OFDM modem scheme using the time-frequency conversion for the baseband processing but also for the mobile communication systems which adopt the modem scheme not using the time-frequency conversion for the baseband processing, and it is assumed that the search for the base station of the mobile communication system B which does not use the time-frequency conversion is desired to be performed when the mobile wireless terminal 1 is in a standby status at the base station belonging to the mobile communication system A or is on line, etc.

The mobile wireless terminal 1 according to an embodiment other than the first embodiment, which uses the time-frequency converting circuit to reduce the time required to measure the signal strength in the frequency band utilized and thus can reduce the power consumption involved in measuring the signal strength, is described as a second embodiment. The mobile wireless terminal 1 according to the second embodiment is configured to be applicable for the mobile communication systems which adopt the OFDM modem scheme using the time-frequency conversion for the baseband processing. The mobile wireless terminal 1 according to the second embodiment may be or may not be configured to be applicable for the mobile communication systems which adopt the modem scheme not using the time-frequency conversion for the baseband processing. In the following case, it is assumed that the mobile wireless terminal 1 is configured to be applicable for both of the mobile communication systems, as is the case with the mobile wireless terminal 1 illustrated in FIG. 1. The explanation of the configuration is the same as that made with reference to FIG. 1, and thus is omitted to prevent the repetition. Further, in the case of the second embodiment, it is assumed that the mobile communication system A, which adopts the OFDM modem scheme using the time-frequency conversion for the baseband processing, is the LTE system.

Figure 5:
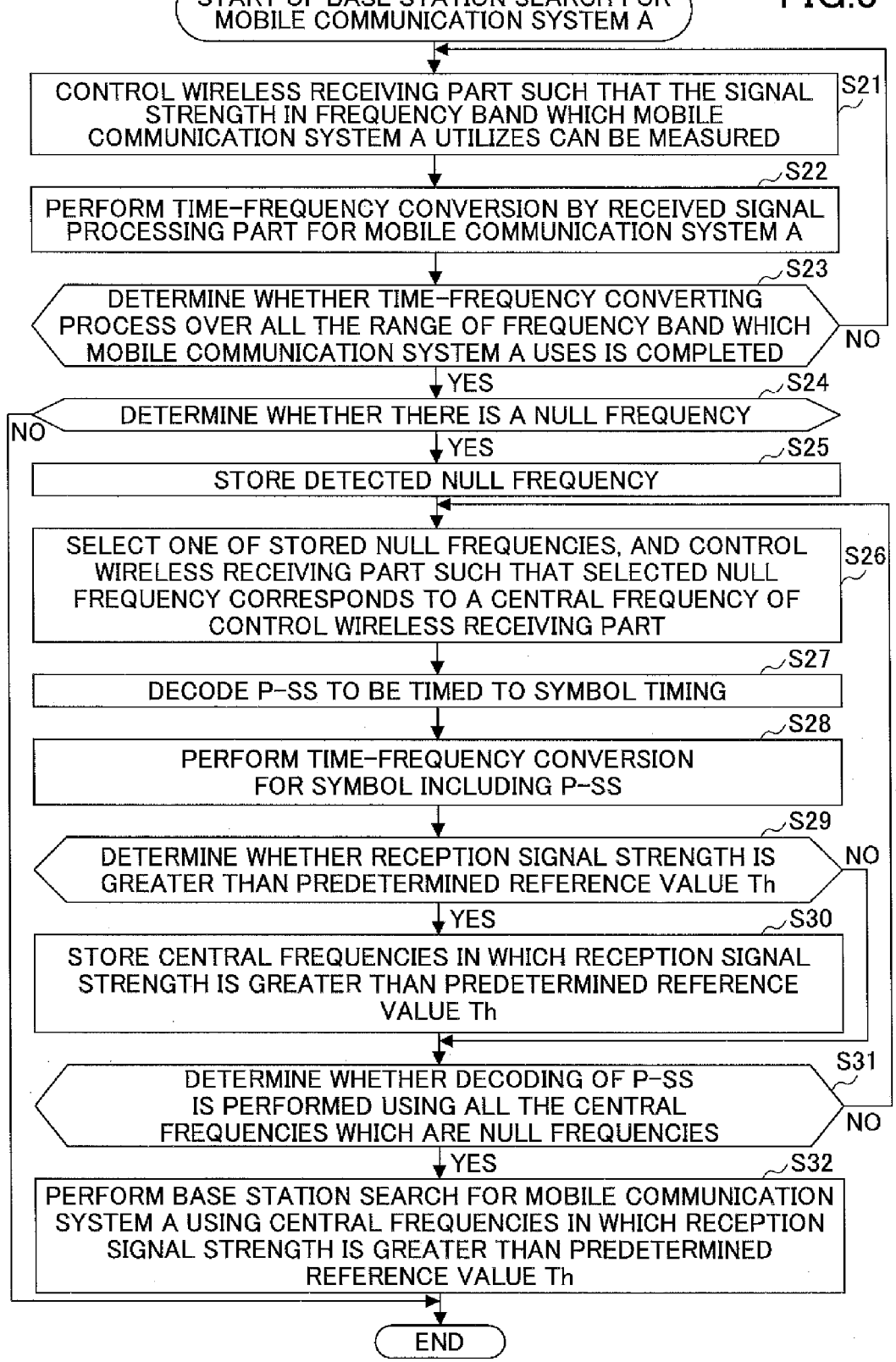
FIG. 5 is a flowchart for explaining an initial base station searching (initial base station search) process of a mobile communication system A (LTE system) in the mobile wireless terminal illustrated in FIG. 1.

With reference to a flowchart in FIG. 5, an initial base station searching (initial base station search) process of the mobile communication system A (the LTE system) in the mobile wireless terminal 1 illustrated in FIG. 1 is described. It is noted that the initial base station search indicates a base station search for the LTE system in a status where the mobile wireless terminal 1 does not obtain information about the central frequency in advance, such as a case where the mobile wireless terminal 1 searches for an unknown service frequency at the time of international roaming, etc.

In step S21, when the communication controlling part 21a of the controlling part 21 determines to start the base station search for the mobile communication system A, the communication controlling part 21a controls the wireless receiving part 13 to set a central frequency such that the signal strength in the frequency band which the mobile communication system A whose base station is to be searched for utilizes can be measured. In other words, the communication controlling part 21a sets a local oscillator frequency for a down-conversion to the central frequency and selects the band-pass filter.

Figure 6:
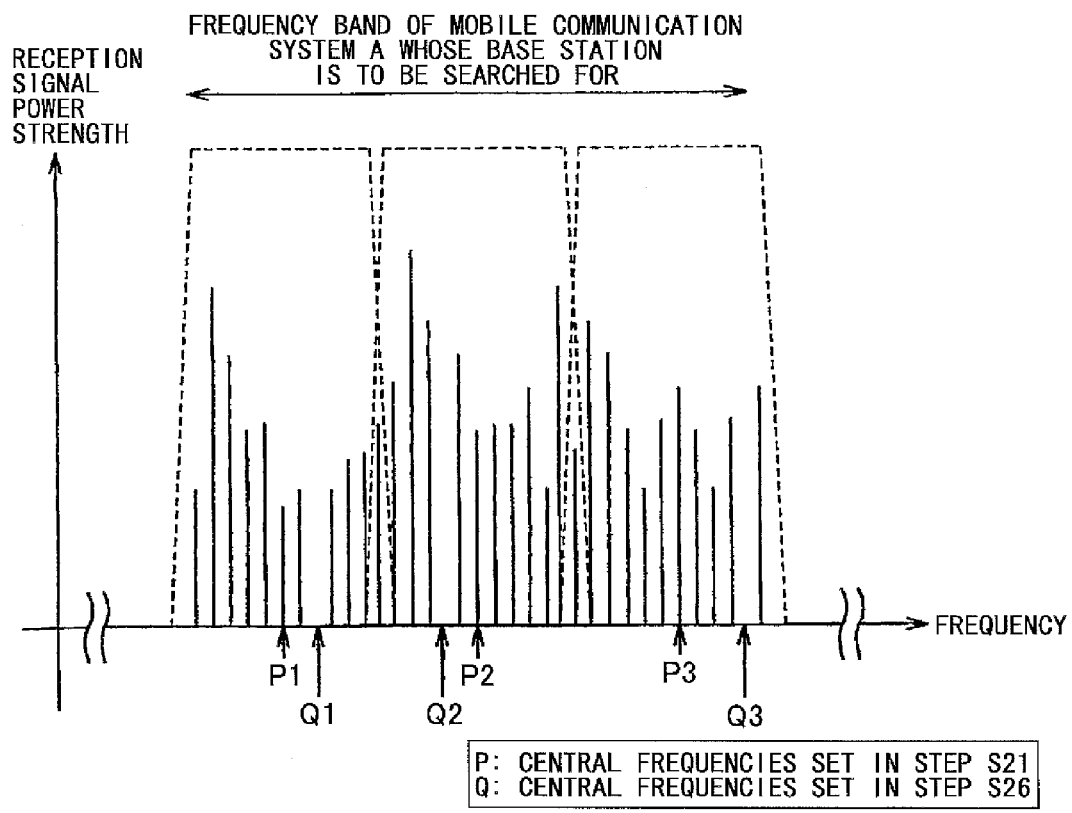
FIG. 6 is a diagram for explaining a way of setting central frequencies when the mobile wireless terminal performs a time-frequency conversion in step S21 and step S26 in FIG. 5.

FIG. 6 is a diagram for explaining a way of setting the central frequencies when the mobile wireless terminal 1 performs a time-frequency conversion in step S21 and step S26 described hereinafter in FIG. 5. P1 through P3 in FIG. 6 indicate locations of the central frequencies set by the mobile wireless terminal 1 in step S21 in FIG. 5. P1 through P3 in FIG. 6 are set with a predetermined frequency interval. As described hereinafter, in step 22 the mobile wireless terminal 1 examines a distribution of the reception signal power strength over all the band of the mobile communication system based on the setting in order to detect the null frequency in step S24.

In step S22, the communication controlling part 21a controls the received signal processing part 14a for the mobile communication system A to perform the time-frequency conversion by the received signal processing part 14a for the mobile communication system A using the set central frequency. At that time, the received signal processing part 14a for the mobile communication system A activates only the time-frequency converting circuit (for example, the DFT part, the FFT part, etc.) among the process circuits in the received signal processing part 14a for the mobile communication system A according to the control of the communication controlling part 21a to perform the time-frequency converting process (i.e., dividing the signal in the time domain into the signals in the frequency domain), and outputs this result to the received signal strength measuring part 22. The received signal strength measuring part 22 measures the signal strength of the received signal in the received signal processing part 14a for the mobile communication system A and outputs the measured result to the communication controlling part 21a. Further, the time-frequency conversion which the mobile wireless terminal 1 performs in step S22 is not the time-frequency conversion performed on a symbol time basis for decoding the received signal of the mobile communication system A but the time-frequency conversion performed repeatedly over at least more than two symbol times (OFDM symbol times). The mobile wireless terminal 1 may perform the time-frequency conversion repeatedly over a wireless frame or so, for example. In the LTE system, the wireless frame consists of ten sub-frames of a period of 1 ms, and thus a total time is 10 ms.

It is noted that the reason why the mobile wireless terminal 1 according to the second embodiment performs the time-frequency conversion repeatedly over at least more than two symbol times is because in the case of the LTE system, data allocated to the wireless resources consisting of the time and the frequency may be located sparsely and thus it becomes difficult to detect the null frequency in step S24 described hereinafter if the time-frequency conversion is merely performed on a symbol time basis.

In step S23, the communication controlling part 21a determines whether the time-frequency converting process over all the range of the frequency band which the mobile communication system A uses is completed. In step S23, if the communication controlling part 21a determines the time-frequency converting process over all the range of the frequency band which the mobile communication system A uses is not completed (i.e., there remains a frequency band within the frequency band to be searched for in the mobile communication system A, for which the time-frequency converting process has not been performed yet), the process routine goes to step S21. With this arrangement, the mobile wireless terminal 1 can control the wireless receiving part 13 again such that the signal strength for the frequency band for which the time-frequency converting process has not been performed yet can be measured.

Figure 7:
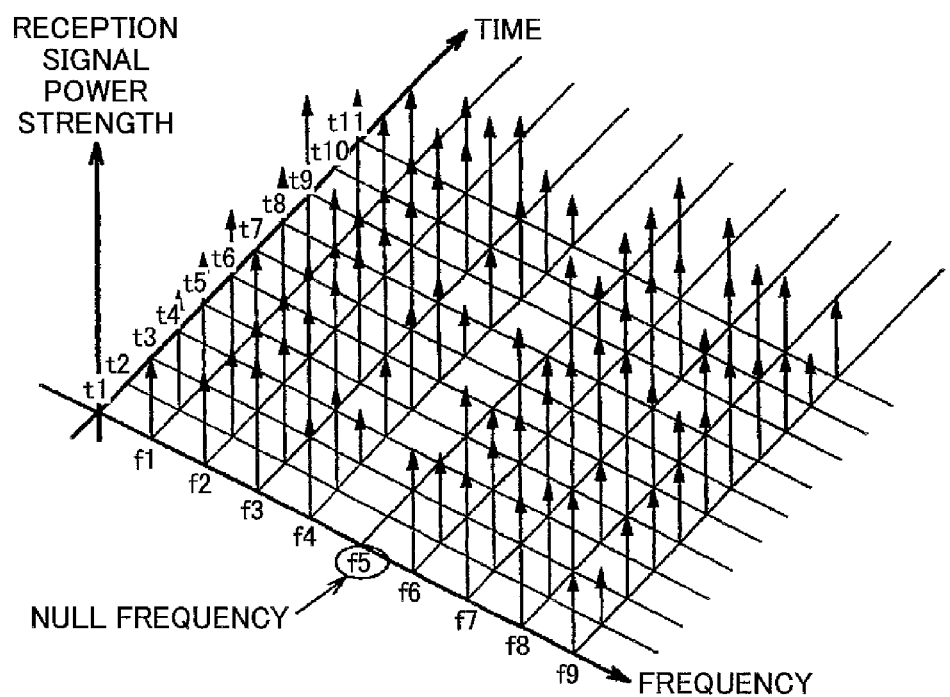
FIG. 7 is a diagram for explaining a way of determining a "null" frequency.

Next, in step S24, the communication controlling part 21a determines whether there is the "null" frequency (i.e., detects the null frequency) based on the results of the time-frequency conversion performed in step S21 through S23. The "null (null point)" indicates a frequency at which the signal strength becomes substantially zero (zero in theory) in every frequency interval corresponding to a period of the digital signal. In theory, the null frequency interval is a frequency $f(=1/T)$ which is the inverse of a signal length of the transmission data signal sequence (a time length or period per 1 bit of the signal) T. The communication controlling part 21a, based on the results of the time-frequency conversion performed repeatedly over plural symbols (OFDM symbols), determines a frequency is the null frequency if the reception signal strength detected at the frequency is as small as the peripheral noise level for the plural symbol time period and the reception signal strength is detected at the neighboring frequencies. FIG. 7 is a diagram for explaining a way of determining a "null" frequency. In the case of FIG. 7, the mobile wireless terminal 1 performs the time-frequency conversion at the times t1 through t11, respectively, and the results thereof are plotted at f1 through f9. It is noted that in the case of FIG. 7, the reception signal power strength is illustrated in a discrete manner, and the time interval between them can be considered as a symbol time in the LTE system. In FIG. 7, the reception signal power strength calculated based on the result of the time-frequency conversion at the frequency f5 is constantly zero. Thus, in the case of FIG. 7, the communication controlling part 21a determines that this frequency f5 is a frequency at which the reception signal power strength is not detected constantly, and determines the frequency f5 as the null frequency. It is noted that in FIG. 7 the reception signal power strength at the frequency f5 is illustrated at zero; however, in fact, the reception signal power strength does not become zero due to the noise or the like existing in the real circumstance of the mobile wireless terminal 1. Thus, the communication controlling part 21a may set a predetermined threshold (reference value) used to determine whether the frequency is the null frequency. In this case, the communication controlling part 21a may determine that the frequency is the null frequency, if the reception signal power strength at the frequency is smaller than or equal to the predetermined threshold. Further, since in theory, the null frequency interval is a frequency $f(=1/T)$ which is the inverse of a signal length of the transmission data signal sequence T, plural null frequencies may be detected in step S24.

In step S24, if the communication controlling part 21a determines that there is the null frequency, the process routine goes to step S25. On the other hand, in step S24, if the communication controlling part 21a determines that there is no null frequency, the process routine ends. In step 24, if the communication controlling part 21a determines that there is the null frequency, the communication controlling part 21 instructs the storing part 25 to store all the null frequencies in step 25. The storing part 25 stores all the null frequencies.

Subsequently, in step 26, the communication controlling part 21a selects one null frequency stored in the storing part 25, sets the selected null frequency as the central frequency for the receiving process by the mobile wireless terminal 1, and controls the wireless receiving part 13 such that the selected null frequency corresponds to the central frequency in the wireless receiving part 13. In other words, the communication controlling part 21a controls the wireless receiving part 13 to set a local oscillator frequency for a down-conversion to the central frequency and select the band-pass filter. Here, it is assumed that the results obtained by performing the time-frequency conversion repeatedly over plural symbol times by step S21 through S23 represents the distribution of the reception signal power strength illustrated in FIG. 6. In this case, the mobile wireless terminal 1 can detect the frequencies Q1 through Q3 in FIG. 6 as the null frequencies. Based on the result, in step S26, the communication controlling part 21a controls the wireless receiving part 13 to set the central frequency for decoding P-SS in step S27. In step 27, the communication controlling part 21a decodes the P-SS (Synchronization signal; a first sync signal) among downstream signals transmitted from the base station belonging to the LTE system to detect symbol timing. It is noted that the first sync signal is used for a cell search for detecting the base station to which the mobile wireless terminal 1 is to be connected. With this arrangement, the mobile wireless terminal 1 can identify the symbol of the P-SS which exists periodically in the wireless signal transmitted by the base station which belongs to the LTE system. For example, in the case of the LTE system in which a FDD (Frequency Division Duplex) scheme is used as a duplex scheme, the P-SS (the first sync signal) is inserted in $6^{th}$ symbol ($6^{th}$ by counting the leading number from 0) in the $0^{th}$ and the $10^{th}$ wireless slots in a FDD wireless frame. The P-SS is transmitted at constant power regardless of the transmission status of the downstream data transmitted from a certain base station. Thus, the mobile wireless terminal 1 measures the reception signal power strength of the symbol of the P-SS and can utilize the measurement results to detect the power at the time of the initial cell search. It is noted that in the case of the second embodiment, the mobile wireless terminal 1 adapts to the symbol timing by decoding the P-SS (i.e., the first sync signal); however, the embodiment is not limited to this case. For example, it is possible to adapt to the symbol timing by further decoding the S-SS (Secondary Synchronization signal; a second sync signal).

In step S28, the communication controlling part 21*a* controls the received signal processing part 14*a* for the mobile communication system A to perform the time-frequency conversion for the symbol which includes the P-SS by the received signal processing part 14*a* for the mobile communication system A using the central frequency set in step S26. At that time, the received signal processing part 14*a* for the mobile communication system A performs the time-frequency conversion according to the control of the communication controlling part 21*a* and outputs the result to the received signal strength measuring part 22. The received signal strength measuring part 22 measures the signal strength of the received signal in the received signal processing part 14*a* for the mobile communication system A and outputs the measured result to the communication controlling part 21*a*. It is noted that in the case of the second embodiment, the process of step S27 and the process of step S28 are explained separately; however, the received signal strength measuring part 22 may measure the reception signal power strength of the P-SS concurrently with the detection of the P-SS in step S27.

In step 29, the communication controlling part 21*a* determines, based on the measurement result of the received signal from the received signal strength measuring part 22, whether there is a frequency (central frequency), within the frequency band which the mobile communication system B uses, in which the reception signal strength is greater than the predetermined reference value (Th) related to the signal strength. In step S29, if the communication controlling part 21*a* determines that there is a frequency, within the frequency band which the mobile communication system A uses, in which the reception signal strength is greater than the predetermined reference value (Th) related to the signal strength, the process routine goes to step S30. On the other hand, in step S29, if the communication controlling part 21*a* determines that there is no frequency, within the frequency band which the mobile communication system A uses, in which the reception signal strength is greater than the predetermined reference value (Th) related to the signal strength, the process routine goes to step S31. In step S30, the communication controlling part 21*a* stores, in the storing part 25, the frequency (central frequency) in which the reception signal strength is greater than the predetermined reference value (Th) found in step S29. In step S31, the communication controlling part 21*a* determines whether the decoding of the P-SS is performed for all the central frequencies which are null frequencies stored in the storing part 25 in step S25. In step 31, if the communication controlling part 21*a* determines that the decoding of the P-SS has not been performed yet for all the central frequencies which are null frequencies stored in the storing part 25, the process routine returns to step S26 and the processes from step S26 are executed repeatedly until the decoding of the P-SS is performed for all the central frequencies which are null frequencies stored in the storing part 25. On the other hand, in step 31, if the communication controlling part 21*a* determines that the decoding of the P-SS is performed for all the central frequencies which are null frequencies stored in the storing part 25, the process routine goes to step 32 in which the communication controlling part 21*a* searches for the base station (base station search) of the mobile communication system A using the central frequency which has the reception signal power strength greater than the predetermined reference value (Th). Then, if there are the central frequencies which have the reception signal power strength greater than the predetermined reference value (Th), the communication controlling part 21*a* performs the base station search for the mobile communication system A using the respective central frequencies.

According to the related art, as illustrated in FIG. 3, the measurement of the signal strength at the time of the base station search for the mobile communication system A has to be performed for all the central frequency candidates (a unit of 100 kHz) which the mobile communication system A can utilize, by adjusting the central frequencies one by one for all the available central frequency candidates to perform the measurement of the signal strength based on the adjustment values of the gain adjusting circuit in the wireless receiving part (corresponding to wireless receiving part 13 illustrated in FIG. 1). In this case, it takes a long time to complete the measurement of the signal strength. For example, in the case of performing for the band 1 (the same as IMT-2000 frequency band of the third generation mobile communication system, 60 MHz) as the LTE system, it is necessary to perform the measurement of the reception signal strength 600 times (=60[MHz]÷100[kHz]). If it is assumed that 5 ms is taken for the measurement of the signal strength for a central frequency candidate, a total processing time becomes 3 s (=5[ms]÷600). On the other hand, the mobile wireless terminal 1 according to the first embodiment can perform the measurement of the reception signal strength at the time of the base station search for the mobile communication system A as a single unit on a certain bandwidth basis by using the time-frequency converting circuit of the received signal processing part 14*a* for the mobile communication system A. Thus, as illustrated in FIG. 6, the number of times for setting the central frequency is reduced in comparison with the related art (illustrated in FIG. 3), and thus the time required to measure the signal strength in searching for the base station of the mobile communication system A is reduced significantly. For example, it is assumed that the mobile communication system A corresponds to the LTE system and the time-frequency converting process can be performed every frequency bandwidth of 20 MHz. In this case, in order to measure the reception signal strength for the band 1 of the LTE system described above, the measurement of the reception signal strength may be performed only for 60 ms (=60[MHz]÷20[MHz]×(10[ms] (null frequency identification time)+10 [ms](P-SS decoding time))). Thus, it is possible to significantly reduce the process time required to measure the reception signal strength for the LTE system, and reduce the power requirements of the mobile wireless terminal 1.

It is noted that the mobile wireless terminal 1 according to the second embodiment can be applied to at least the mobile communication systems which adopt the OFDM modem scheme using the time-frequency conversion for the baseband processing, and can be applied to communication systems of terrestrial digital broadcasting which adopt the OFDM modem scheme using the time-frequency conversion for the baseband processing, for example.

The mobile wireless terminal 1 according to the embodiment receives the wireless signal from the base station which belongs to the mobile communication system using the time-frequency conversion for the baseband processing; has the time-frequency converting circuit; processes the wireless signal from the base station which belongs to the mobile communication system; successively sets, in the wireless receiving part, central frequencies within regions, wherein a frequency band that the mobile communication system uses is divided into the regions having a predetermined bandwidth; and measures signal strength of a received signal over all the regions of the frequency band that the mobile communication system uses based on time-frequency conversion results for the respective regions from the time-frequency converting circuit, the time-frequency conversion results being obtained using the respective central frequencies set.

With this arrangement, it is possible to reduce the process time required to measure the signal strength in the frequency band utilized using the time-frequency converting circuit and reduce the power requirements involved in measuring the signal strength.

It is noted that a series of the processes described in the embodiment may be executed by software resources or hardware resources.

Further, in the embodiment, the steps in the flowchart are executed in a time series according to the order illustrated; however, they are not necessarily performed in a time series, and they may include the processes which may be performed in parallel or individually.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A mobile wireless terminal comprising:
   a wireless receiving part configured to receive a wireless signal from a base station which belongs to a mobile communication system using a time-frequency conversion for baseband processing;
   a received signal processing part that includes a time-frequency converting circuit and is configured to process the wireless signal from the base station which belongs to the mobile communication system;
   a setting part configured to successively set, in the wireless receiving part, central frequencies within regions, wherein a frequency band that the mobile communication system uses is divided into the regions having the same bandwidth or different bandwidths; and
   a received signal strength measuring part configured to measure signal strength of a received signal in the received signal processing part over the regions of the frequency band that the mobile communication system uses based on time-frequency conversion results from the time-frequency converting circuit and during a time other than at the time of an intermittent reception in which a predetermined process is performed if the mobile wireless terminal performs an intermittent receiving operation at a predetermined intermittent receiving cycle, the time-frequency conversion results being obtained for the respective regions using the respective central frequencies set by the setting part, the respective central frequencies set by the setting part enabling searching for a base station which belongs to a second mobile communication system not using the time-frequency conversion for the baseband processing and using the measured signal strength.

2. A mobile wireless terminal comprising:
   a wireless receiving part configured to receive a wireless signal from a base station which belongs to a first mobile communication system using a time-frequency conversion for baseband processing, or from a base station which belongs to a second mobile communication system not using the time-frequency conversion for the baseband processing;
   a first received signal processing part that includes a time-frequency converting circuit and is configured to process the wireless signal from the base station which belongs to the first mobile communication system;
   a second received signal processing part configured to process the wireless signal from the base station which belongs to the second mobile communication system;
   a setting part configured to successively set, in the wireless receiving part, central frequencies within regions, wherein a frequency band that the second mobile communication system uses is divided into the regions having the same bandwidth or different bandwidths; and
   a received signal strength measuring part configured to measure signal strength of a received signal in the first received signal processing part over the regions of the frequency band that the second mobile communication system uses based on time-frequency conversion results from the time-frequency converting circuit and during a time other than at the time of an intermittent reception in which a predetermined process is performed if the mobile wireless terminal performs an intermittent receiving operation at a predetermined intermittent receiving cycle, the time-frequency conversion results being obtained for the respective regions using the respective central frequencies set by the setting part, the respective central frequencies set by the setting part enabling searching for the base station which belongs to the second mobile communication system using the measured signal strength.

3. The mobile wireless terminal as claimed in claim 2, further comprising a base station searching part configured to search for the base station which belongs to the second mobile communication system via the wireless receiving part and the second received signal processing part, using the central frequency in which the received signal has the signal strength greater than a predetermined reference value.

4. The mobile wireless terminal as claimed in claim 3, wherein the base station searching part searches for the base station which belongs to the second mobile communication system via the wireless receiving part and the second received signal processing part, successively using the respective central frequencies in which the received signal has the signal strength greater than the predetermined reference value.

5. The mobile wireless terminal as claimed in claim 3, wherein the first mobile communication system is related to WiMAX or LTE, and the second mobile communication system is related to WCDMA, CDMA 2000 or GSM.

6. The mobile wireless terminal as claimed in claim 2, further comprising a storing part configured to store all the central frequencies in which the received signal has the signal strength greater than a predetermined reference value.

7. A mobile wireless terminal comprising:
   a wireless receiving part configured to receive a wireless signal from a base station which belongs to a mobile communication system using a time-frequency conversion for baseband processing;

a received signal processing part that includes a time-frequency converting circuit and is configured to process the wireless signal from the base station which belongs to the mobile communication system;

a first setting part configured to successively set, in the wireless receiving part, central frequencies within regions, wherein a frequency band that the mobile communication system uses is divided into the regions having the same bandwidth or different bandwidths;

a detecting part configured to detect one or more null frequencies over the regions of the frequency band that the mobile communication system uses based on time-frequency conversion results from the time-frequency converting circuit, the time-frequency conversion results being obtained for the respective regions using the respective central frequencies set by the first setting part;

a second setting part configured to set, in the wireless receiving part, the null frequency detected by the detecting part as the central frequency; and a received signal strength measuring part configured to detect a symbol including a sync signal appearing at a predetermined cycle in the wireless signal transmitted from the base station which belongs to the mobile communication system, and measure signal strength of a received signal in the received signal processing part based on a time-frequency conversion result from the time-frequency converting circuit and during a time other than at the time of an intermittent reception in which a predetermined process is performed if the mobile wireless terminal performs an intermittent receiving operation at a predetermined intermittent receiving cycle, the time-frequency conversion result being obtained for the symbol including the sync signal using the null frequency set as the central frequency by the setting part, the central frequency set by the setting part enabling searching for a base station which belongs to a second mobile communication system not using the time-frequency conversion for the baseband processing and using the measured signal strength.

8. The mobile wireless terminal as claimed in claim 7, further comprising a base station searching part configured to search for the base station which belongs to the mobile communication system via the wireless receiving part and the received signal processing part, using the central frequency in which the received signal has the signal strength greater than a predetermined reference value.

9. The mobile wireless terminal as claimed in claim 7, wherein the mobile communication system is a LTE system.

10. The mobile wireless terminal as claimed in claim 7, wherein if plural null frequencies are detected by the detecting part, the second setting part sets the respective frequencies as the central frequencies in the wireless receiving part, the received signal strength measuring part measures the signal strength of the received signal in the received signal processing part based on the time frequency conversion results from the time-frequency converting circuit, the time-frequency conversion results being obtained for the symbol including the sync signal using the null frequencies set to the central frequencies by the setting part.

11. The mobile wireless terminal as claimed in claim 7, further comprising a storing part configured to store the central frequency in which the received signal has the signal strength greater than a predetermined reference value.

12. The mobile wireless terminal as claimed in claim 7, wherein the sync signal includes at least a first sync signal and more than one second sync signal.

* * * * *